United States Patent Office 3,583,957
Patented June 8, 1971

3,583,957
METHOD OF PRODUCING A POLYMER IN MINUTE GLOBULAR PARTICLES
Richard Chromeček and Iva Gavrilová, Prague, Czechoslovakia, assignors to Ceskoslovenska Akademie Ved, Prague, Czechoslovakia
No Drawing. Filed May 22, 1968, Ser. No. 731,259
Int. Cl. C08f 15/18
U.S. Cl. 260—86.1                                   3 Claims

ABSTRACT OF THE DISCLOSURE

Minute globular particles of copolymers of monoolefins and diolefins are produced in a quiescent polymerization mixture of which at least 40% are constituted by a solvent which initially dissolves the monomers, but by which the copolymer is neither dissolved nor significantly swelled. The loose mass of particles formed by polymerization readily disintegrates when immersed in an inert liquid.

---

This invention relates to the copolymerization of monoolefins to produce globular particles, and particularly to the preparation of globular particles having a diameter of less than ten microns.

The conventional suspension polymerization process can be controlled readily to produce globular particles 0.1 to 2 millimeters in diameter. With the use of high-speed stirrers and emulsifiers, the size of the individual particles can be reduced to 20–100 microns. When smaller particles are needed, coarser material is crushed or ground, and the comminuted material is classified according to size, hydraulic classification usually being necessary for fractions smaller than 100 microns.

It has now been found that monomers having one olefinic double bond and two olefinic double bonds are copolymerized to globular particles smaller than ten microns in diameter if at least 40 percent of the polymerization mixture is constituted by a solvent inert to the monomers and to the resulting copolymer. The monomers are initially dissolved in the solvent whereas the copolymer is insoluble in the solvent and is not significantly swelled by the same. Under these conditions, a mass of loosely cohering globular copolymer particles of the desired size is formed. The mass is readily disintegrated into the individual particles by applied light pressure or by simply immersing the mass in an inert liquid.

Stirring of the polymerization mixture is unnecessary, and it is preferred that the mixture be kept quiescent during the copolymerization except for unavoidable thermal currents and the like.

The average size or diameter of the globular or approximately spherical particles is inversely related to the amount of solvent in the polymerization mixture, and the particles of the same batch have closely similar diameters. The polymerizates obtained by the method of the invention are free from coarse particles, and need not be classified for most applications.

The apparatus necessary for producing copolymer particles by the method of the invention is simpler than conventional emulsion polymerization equipment, a stirrer not being required. The polymer, when present as a phase separate from the liquid solvent, is a solid which does not tend to stick to the walls of the reaction vessel. The globular particles are dense and homogeneous. Their mechanical strength is more than adequate to permit mechanical disintegration of the loose mass of copolymer originally formed without affecting the shape of individual particles. It has not been possible heretofore to convert olefinic monomers into copolymer particles which combine the small and practically uniform size and the globular shape of the products obtained by the present method.

The following examples are further illustrative of this invention:

EXAMPLE 1

10 parts (by weight) toluene, 0.5985 part ethyleneglycol dimethacrylate, 2.3015 parts ethyleneglycol monomethacrylate, and 0.15 part benzoyl peroxide were mixed until the methacrylates dissolved, and the mixture was heated in a closed vessel at 50° C. without stirring for six hours.

The mass of loosely cohering polymer particles was crushed into individual, practically spherical particles by compressing the mass lightly, and the particles were washed with ethanol to remove the toluene, and dried by evaporation of the ethanol.

The solid, homogeneous particles so obtained varied in diameter between 2.3 and 2.7 micron and averaged slightly more than 2.5 micron.

Similar narrow particles size fractions having different averages sizes were prepared by varying the percentage of toluene in the polymerization mixture as follows:

| Percent toluene: | Average grain size, $\mu$ |
|---|---|
| 40 | 4.31 |
| 50 | 3.54 |
| 60 | 3.40 |
| 70 | 3.00 |
| 80 | 2.50 |

The particles prepared in the manner described above could be used in chromatographic columns without further processing. They were also employed successfully for thin layer chromatography.

EXAMPLE 2

1.2 ml. divinylbenzene solution (50% in petroleum ether) and 1.8 ml. styrene were dissolved in 12 ml. petroleum ether and were copolymerized in the presence of 0.15 g. benzoyl peroxide at 70° C. in a closed flask in six hours. The polymerization mixture was not disturbed by agitation during this period.

The petroleum ether was removed from the mass of polymer particles in the flask by distillation, and enough water was introduced to cover the polymerizate which then spontaneously disintegrated into approximately spherical particles having an average diameter of 7 microns, and varying only slightly from the average. They were separated from most of the water by screening and were then dried in warm air.

The particle size could be controlled by varying the percentage of solvent in the initial polymerization mixture in the same manner as described in Example 1, but uncontrollable growth and agglomeration of the particles occurred when the amount of solvent in the mixture was reduced to less than 40%.

The copolymer of styrene and divinylbenzene also disintegrated spontaneously upon wetting with liquids other than water, such as ethanol, in which the copolymer does not swell to a significant extent. The distintegration of the initially formed block is apparently caused by surface tension effects.

The styrene-divinyl benzene copolymer powder could further be processed in a manner known in itself to prepare ion exchange resins whose individual particles had the high mechanical strength and high surface-to-weight ratio of the starting material.

The solvents employed in the polymerization mixtures of the invention do not participate in a chemical reaction, and their chemical nature is thus irrelevant in itself. Other normally liquid aromatic hydrocarbons may thus be substituted for the toluene referred to in Example 1, and other normally liquid alkanes for the petroleum ether of Example 2.

The liquids used to disintegrate the mass of loosely cohering copolymer particles may be chosen from an even wider range of materials. If the immersion medium causes surface swelling of the copolymer, the resulting relative displacement of the particles hastens disintegration of the mass, but this is not usually needed.

What is claimed is:

1. In a method of copolymerizing an ethyleneglycol methacrylate with a lesser amount of ethyleneglycol dimethacrylate in a polymerization mixture containing a polymerization catalyst, whereby a mass of loosely cohering globular particles of the resulting copolymer is formed, the improvement which comprises:
   (a) conducting the copolymerization in an aromatic hydrocarbon solvent inert to said monomers and to the resulting copolymer and wherein the said copolymer is insoluble in the solvent and not substantially swelled by contact with said solvent, constituting at least 40 percent of said polymerization mixture,
   (b) said monomers being initially dissolved in said solvent, and
   (c) disintegrating said mass into said particles without substantially affecting the size thereof.

2. In a method as set forth in claim 1, said polymerization mixture being kept substantially physically quiescent during said copolymerizing.

3. In a method as set forth in claim 2, said mass being disintegrated by being thereafter immersed in a liquid other than said solvent inert to said copolymer.

References Cited

UNITED STATES PATENTS

| 2,500,265 | 3/1950 | Walling et al. | 260—86.1E |
| 3,162,677 | 12/1964 | Horsley et al. | 260—86.1 |
| 3,220,960 | 11/1965 | Wichterle et al. | 260—86.1 |

HARRY WONG, Jr., Primary Examiner

U.S. Cl. X.R.

260—2.1, 88.2